E. KNAUSS & F. H. PETITMAIRE.
COMBINED FOOT REST AND HEATER FOR MOTOR VEHICLES.
APPLICATION FILED DEC. 29, 1913.
1,134,870.
Patented Apr. 6, 1915.
2 SHEETS—SHEET 2.
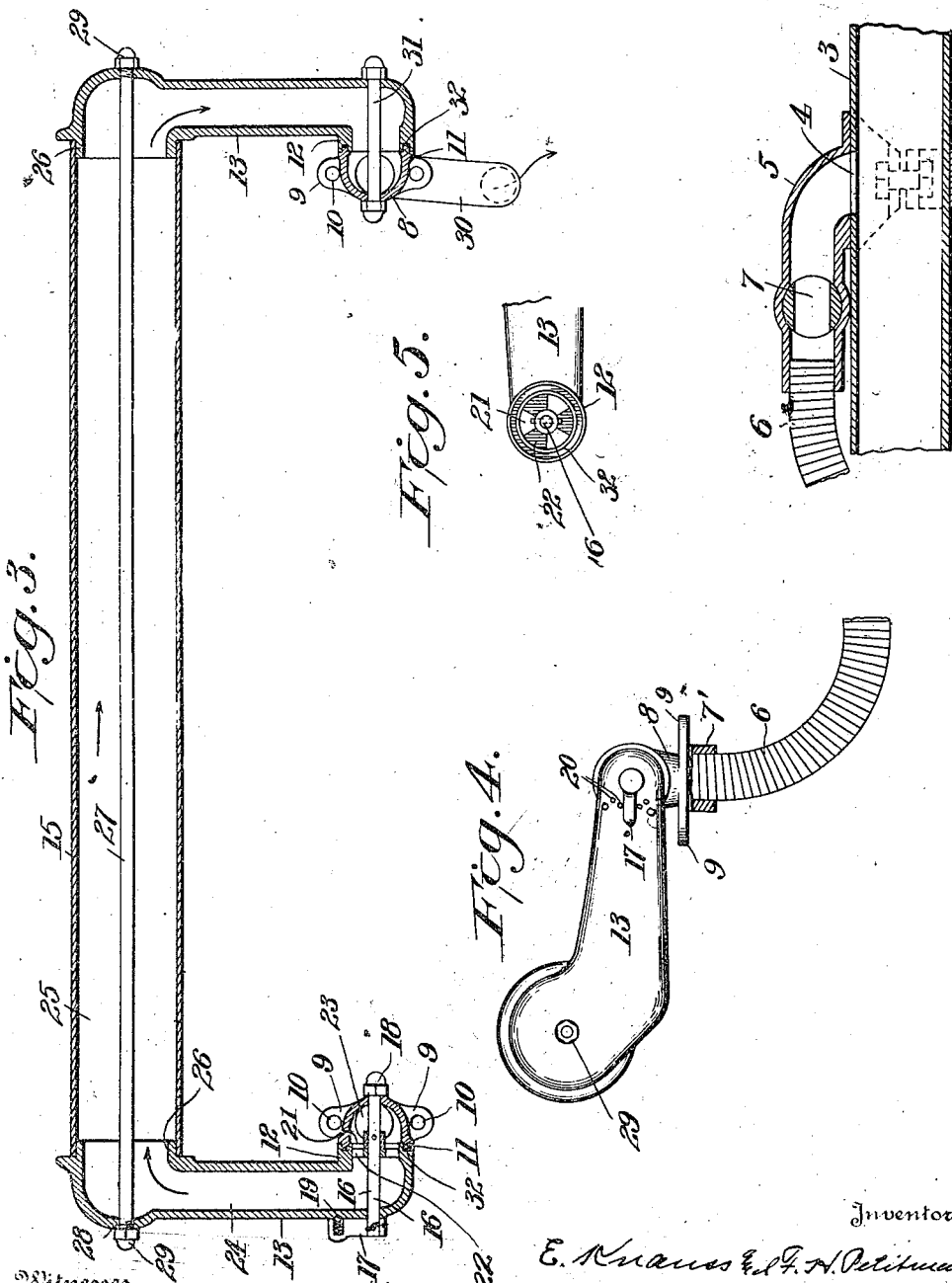

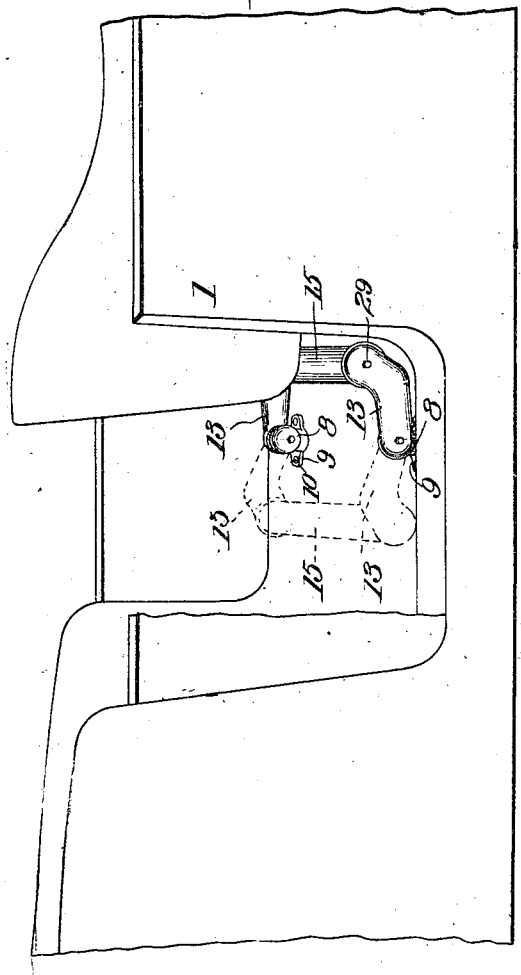
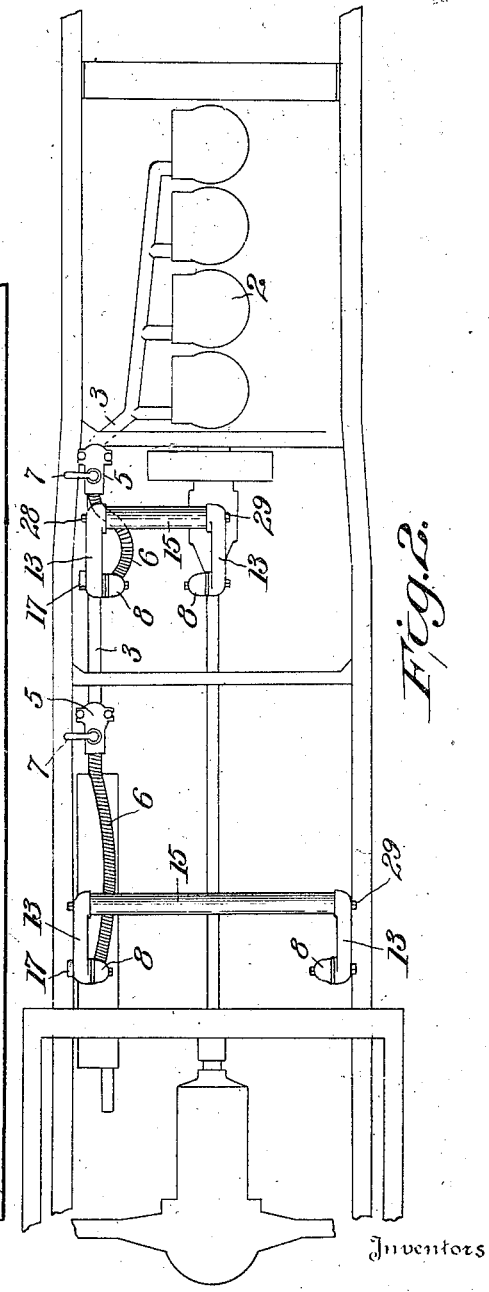

UNITED STATES PATENT OFFICE.

EDWARD KNAUSS, OF MELROSE, MASSACHUSETTS, AND FELIX H. PETITMAIRE, OF PHILADELPHIA, PENNSYLVANIA.

COMBINED FOOT-REST AND HEATER FOR MOTOR-VEHICLES.

1,134,870.

Specification of Letters Patent.

Patented Apr. 6, 1915.

Application filed December 29, 1913. Serial No. 809,386.

*To all whom it may concern:*

Be it known that we, EDWARD KNAUSS and FELIX H. PETITMAIRE, the former a citizen of the United States, residing at Melrose, county of Middlesex, and State of Massachusetts, and the latter a citizen of France, residing at Philadelphia, in the county of Philadelphia and State of Pennsylvania, have invented certain new and useful Improvements in Combined Foot-Rests and Heaters for Motor-Vehicles; and we do hereby declare the following to be a full, clear, and exact description of the invention, such as will enable others skilled in the art to which it appertains to make and use the same.

This invention relates to a combined foot rest and heater especially adapted for use in automobiles, and has for its object to provide an apparatus of this kind, which will be simple in construction, efficient in action, and more convenient in use than those heretofore proposed.

With these and other objects in view, the invention consists in the novel details of construction, and combinations of parts more fully hereinafter disclosed and particularly pointed out in the claims.

Referring to the accompanying drawings forming a part of this specification, in which like numerals designate like parts in all the views:—Figure 1 is an elevational view partly broken away of an automobile provided with our invention; Fig. 2 is a plan view of the parts shown in Fig. 1 together with some additional parts not illustrated therein; Fig. 3 is an enlarged sectional view of our combined foot rest and heater detached from the automobile; Fig. 4 is an end elevational view partly in section of the parts shown in Fig. 3, together with the connection with an exhaust pipe; and Fig. 5 is a detail view of the valve controlling our foot rest and heater.

1 indicates the body of an automobile or other vehicle; 2, the engines thereof; and 3, the exhaust pipe from said engines.

In carrying out our invention we preferably cut a hole, such as 4, in the exhaust pipe 3 and provide a coupling such as 5 connecting said hole with the pipe 6 which feeds the exhaust gases to the heater. We also preferably provide a valve such as 7 in the coupling 5 in order to cut off the exhaust gases from the pipe 6 when desired. The pipe 6 may be of any desired construction, but we find a flexible pipe very convenient for our purpose, and have so shown one of this nature in the drawings. This feed pipe 6 is joined as at 7' to the hollow base or support foot member 8 of our foot rest, which member is provided with the extensions or flanges 9 having the holes 10 by which it may be secured to the floor of the machine. The said support or member 8 rises from the flanges 9, as best shown in Fig. 4, and is provided with a circular rim-like flange 11 which tightly fits a corresponding groove in the horizontally extending member 12 of the hollow arm or support 13 for the foot rest member 15, as will be clear from Fig. 3 of the drawings.

Passing through the lower end of the hollow arm or support 13 and the base support or member 8 is the rod 16 provided at one end with the handle 17 and at the other end with the nut 18. The handle 17 is provided with a spring controlled catch 19 adapted to take in the depressions 20 in the face of the member 13, and to hold said handle at any angular position to which it may be brought. Carried by the rod 16 and under the control of the handle 17, is the valve 21 adapted to control the ports 22 located in the horizontal projection 12 of said member 13, as will be clear from Figs. 3 and 5.

The base support or member 8 is provided with the bore or passage 23, communicating through the ports 22 with the passage 24 in the supporting arm or member 13, which passage in turn communicates with the passage 25 in the foot rest 15, all as will be clear from Fig. 3. The member 13 is provided with a second horizontal extension 26 which snugly fits the interior of the foot rest 15, and a rod 27 passes through the upper end of said arm or support 13, and through the center of the foot rest 15 in order to hold the parts together, the said rod 27 being provided with the thread 28 and the nut 29 for this purpose.

The supporting arms or members 13 are two in number, as illustrated in Fig. 3, and either parts are duplicates of each other, as will be clear from the drawings. The pipe 6 carrying the exhaust gases to the bore 23 of the base member 8 may be attached to either of the said base or foot members 8, and to the other of said base or foot members, we attach an exhaust pipe 30 for leading away the gases after they have passed through the foot rest 15. This exhaust pipe 30 may lead to the rear of the machine or any other convenient place, and the gas discharged into the atmosphere.

In Fig. 3, we have shown the feed pipe 6 for the heater as connected to the base 8 on the left of Fig. 3, and the exhaust pipe 30 for the gases as connected on the right of said figure. There being no need for a valve, such as 21 in that end of the heater connected with the exhaust pipe 30, we merely pass a rod 31 through the parts in order to hold them together.

The operation of our improved foot rest and heater is as follows:—The members 8 being firmly secured to the floor of the automobile as by passing bolts or screws through the holes 10 in the flanges 9 of the members 8, the hollow arm-like supports 13 may be freely swung around the rods 16 and 31 as centers, for the rim-like flanges 11 of the said members 8 freely move in their corresponding grooves 32 carried by the horizontal members 12 rigid with the arms 13. The members 11 and 32 thus form gas tight joints which permit the ready swing of the arms 13 and the foot rest 15 around the said rods 16 and 31, as indicated in the full and dotted lines in Fig. 1. It results from this that when the member 15 is desired as a foot rest, it may be swung in the full line position shown in Fig. 1, and when it is not desired to use the same as a foot rest, it may be swung into its dotted line position toward the seat, whereupon the feet of the occupant will extend beyond the same, and it will therefore be out of the way.

It will thus be seen that we have provided an apparatus which operates as a combined foot rest and heater which does not interfere with the free passage of the exhaust gases from the engine to the muffler, should a muffler be employed. Further, it will be seen that it is not necessary to close any valve in the exhaust pipe to obtain heat in the radiator. In addition, the heat through the foot rest may be readily controlled by turning the handle 17 and thereby operating the valve 21. Since the exhaust pipe leads directly to the muffler while the passages leading to and through the foot rest 15 are deflected and more or less restricted, the lighter and cleaner gases are employed for heat, while the heavier gases pass on to the muffler and through it to the air.

Our combined foot rest and heater saves fuel, in that it reduces the back pressure in the exhaust pipe. Further, owing to the fact that the back pressure in the exhaust pipe caused by the use of the muffler varies from a few ounces to several pounds depending on the speed of the engine and the condition of the muffler, by affording another passage for the exhaust gases, as is the case in our combined foot rest and heater, we are enabled to reduce the back pressure as above stated, and thereby render more power available for the operation of the car.

The member 15 of the foot rest being made of comparatively thin metal, as illustrated, radiates the heat very quickly so that the occupant of the car does not have to wait for the heat after the motor is started.

In addition to the above, the passages through the pipe 6 and the arms 13 are smaller than the passage through the member 15, so the gases after they leave the exhaust pipe 3, pass through the enlarged foot rest and into the pipe 30, so that any sounds which otherwise would be produced are muffled, and its action is consequently noiseless. The joints afforded by the members 11 and 32 being gas tight, as well as the joints between the horizontal members 26 and the foot rest 15, no odors or exhaust gases can escape into the body of the car, so that the device is cleanly and odorless.

Owing to the fact that the exhaust gases may suddenly expand through this foot rest and into the atmosphere without passing through the muffler, a greater or less partial vacuum is produced in the exhaust pipe, and this partial vacuum induces a more rapid discharge through the exhaust ports of the motor. Accordingly, in use, this foot rest and heater is found to act as a scavenger and to help keep the cylinders of the motor clean. As only waste heat is employed, the cost thereof is nothing.

These foot warmers and foot rests may be placed at any desired position in the car, but it is preferred to have those in front of the car shorter than those in the rear, as indicated in Fig. 2 so that they will not interfere with the operation of the chauffeur.

It is obvious that those skilled in the art may vary the details of construction, as well as the arrangement of parts without departing from the spirit of our invention, and therefore we do not wish to be limited to the above disclosure except as may be required by the claims.

What we claim is:—

1. In a combined heater and pivoted foot rest for automobiles, the combination of a hollow base support adapted to be secured to the floor of the machine; a hollow arm support pivotally secured at one end to said base support; a foot rest member secured at one end to the other end of said hollow arm support; a second hollow arm support to one end of which the other end of said foot rest member is secured; a rod passing through said foot rest member and each of said hollow arm supports, to hold the parts together; a second base support adapted to be secured to the floor of the machine to which the other end of said second hollow arm support is pivotally attached; and means for supplying hot gases to said parts, substantially as described.

2. In a combined heater and pivoted foot rest for automobiles the combination of a hollow base support adapted to be secured to the floor of the machine; a hollow arm; a pivotal connection between said arm and said base support; a rod passing through said base support and arm at said connection and provided with a handle having a controlling catch; a valve carried by said rod and controlled by said handle adapted to govern the passage of hot gases through said base support and said arm; a hollow foot rest member associated with said arm; and means for leading hot gases to said base support, substantially as described.

3. In a combined heater and foot rest, the combination of a pair of hollow base supports adapted to be secured to the floor of an automobile; a supply pipe connected to one of said supports; an exhaust pipe connected to the other of said supports; a pair of hollow arms pivotally connected at one end with said base supports; a valve in the pivoted connection between one of said base supports and one of said arms; a hollow foot rest member connected to the other ends of said arms; and detachable means for holding said foot rest and arms together, substantially as described.

4. In a combined heater and foot rest the combination of a pair of hollow base supports connected to the floor of an automobile; a pair of hollow arms pivotally connected at one end to said base supports; a foot rest member having an enlarged hollow chamber to act as a muffler detachably attached to the other ends of said hollow arms; means for readily connecting one of said base supports to the exhaust pipe of the engine; means for leading off the exhaust gases from the other of said base supports; and a valve for controlling the passage of gases through said supports, substantially as described.

5. In a combined heater and foot rest the combination of a pair of hollow base supports adapted to be secured to the floor of an automobile; a pair of hollow arms; pivotal connections comprising rods passing through one end of said arms and the tops of said base supports; a valve carried by one of said rods; a foot rest member having an enlarged chamber acting as a muffler detachably connected to the other ends of said arms; and a rod passing through said foot rest member and arms, substantially as described.

In testimony whereof we affix our signatures, in presence of two witnesses.

EDWARD KNAUSS.
FELIX H. PETITMAIRE.

Witnesses:
T. A. WITHERSPOON,
JAS. H. BLACKWOOD.